US012677149B2

(12) United States Patent
Ma et al.

(10) Patent No.: US 12,677,149 B2
(45) Date of Patent: Jul. 7, 2026

(54) ACCESS CONTROL METHOD AND APPARATUS

(71) Applicant: HUAWEI TECHNOLOGIES CO., LTD., Shenzhen (CN)

(72) Inventors: Chunyan Ma, Shenzhen (CN); Hui Ding, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 37 days.

(21) Appl. No.: 18/829,976

(22) Filed: Sep. 10, 2024

(65) Prior Publication Data

US 2024/0430676 A1     Dec. 26, 2024

Related U.S. Application Data

(63) Continuation of application No. PCT/CN2023/080458, filed on Mar. 9, 2023.

(30) Foreign Application Priority Data

Mar. 17, 2022     (CN) .......................... 202210264265.7

(51) Int. Cl.
*H04W 12/06* (2021.01)
*H04W 76/10* (2018.01)

(52) U.S. Cl.
CPC ........... *H04W 12/06* (2013.01); *H04W 76/10* (2018.02)

(58) Field of Classification Search
None
See application file for complete search history.

(56) References Cited

U.S. PATENT DOCUMENTS

2022/0060893 A1*  2/2022  Gundavelli ........... H04W 12/40

FOREIGN PATENT DOCUMENTS

WO     WO-2018137873 A1 *   8/2018   ........... H04L 63/164
WO     WO-2019017836 A1 *   1/2019   ........... H04W 12/08
WO     WO-2020253736 A1 *  12/2020   ............... H04L 9/40

OTHER PUBLICATIONS

Samsung, "Policy Control Using DN Authorization Profile Index," Feb. 25-Mar. 1, 2019, 3GPP Draft; S2-1901665 23.503 Rev, 3GPP TSG Mobile Competence Centre, vol. SA WG2 Meeting #131, Santa Cruz, Tenerife, Spain, pp. 1-11. (Year: 2019).*

(Continued)

*Primary Examiner* — Nelson S. Giddins
(74) *Attorney, Agent, or Firm* — Fish & Richardson P.C.

(57) ABSTRACT

This application discloses an access control method and an apparatus. The method includes: An SMF receives a session establishment request sent by a terminal. The SMF determines, based on the request, to send an authentication request to a campus server. The SMF receives an authentication failure response message sent by the campus server. When the SMF determines to accept the session establishment request, the SMF sends a policy association establishment request to a PCF and receives a policy association establishment response sent by the PCF. The SMF enforces a policy for a session of the terminal according to a policy rule in the policy association establishment response. The SMF sends a session establishment response message to the terminal.

20 Claims, 8 Drawing Sheets

(56) References Cited

OTHER PUBLICATIONS

Samsung, "Policy Control using DN authorization profile index," 3GPP TSG SA WG2 Meeting #131, S2-1901665, Santa Cruz, Tenerife, Spain, Feb. 25-Mar. 1, 2019, 11 pages.

Extended European Search Report in European Appln. No. 23769656. 2, mailed on Apr. 29, 2025, 7 pages.

3GPP TS 23.501 V17.3.0, "3rd Generation Partnership Project; Technical Specification Group Services and System Aspects; System architecture for the 5G System (5GS); Stage 2; (Release 17)," Dec. 2021, 559 pages.

3GPP TS 23.502 V17.3.0, "3rd Generation Partnership Project; Technical Specification Group Services and System Aspects; Procedures for the 5G System (5GS); Stage 2 (Release 17)," Dec. 2021, 727 pages.

International Search Report and Written Opinion in International Appln. No. PCT/CN2023/080458, mailed on May 18, 2023, 13 pages (with English Translation).

* cited by examiner

ACCESS CONTROL METHOD AND APPARATUS

CROSS-REFERENCE TO RELATED APPLICATIONS

This application is a continuation of International Application No. PCT/CN2023/080458, filed on Mar. 9, 2023, which claims priority to Chinese Patent Application No. 202210264265.7, filed on Mar. 17, 2022. The disclosures of the aforementioned applications are hereby incorporated by reference in their entireties.

TECHNICAL FIELD

This application relates to the field of wireless communication, and in particular, to an access control method and an apparatus.

BACKGROUND

Registration of user equipment (UE) may include the following procedure: The UE sends a registration request to an access and mobility management function network element (AMF) over a radio access network (AN). The AMF determines a corresponding unified data management (UDM) based on a UE identifier, and requests to obtain subscription data of the UE from the UDM. After receiving the request, the UDM may obtain actual subscription data of the UE from a unified data repository (UDR). In addition, the AMF can further initiate a user policy control establishment request (UEPolicyControl_Create) and an access management policy control establishment request (AMPolicyControl_Create) to a policy control function (PCF) to obtain a UE policy and an access control policy respectively. In this process, the PCF returns the access control policy to the AMF, and the AMF provides the UE policy to the UE.

After the registration is completed, the UE may request to establish a packet data unit (PDU) session. The establishment of the PDU session may include the following procedure: The UE sends a session establishment request to the AMF over the RAN. The AMF selects an SMF for the session to provide a service for the session, stores a correspondence between the SMF and the PDU session, and sends the session establishment request to the session management function (SMF). The SMF selects a corresponding user plane function (UPF) for the UE, establishes a user plane transmission path, and allocates an IP address to the established transmission path. In this process, the SMF further initiates a policy control session establishment request to the PCF, to establish a policy control session between the SMF and the PCF. In a policy control session establishment process, the SMF stores a correspondence between the policy control session and the PDU session. In addition, an application function network element (AF) may further establish an AF session with the PCF, and the PCF binds the AF session to the policy control session.

In the PDU session establishment procedure, an operator can configure a secondary authentication indication at a granularity of a data network name (DNN)/single-network slice selection assistance information (S-NSSAI). However, currently a technical solution for secondary authentication is to be improved.

SUMMARY

This application provides an access control method and an apparatus, to resolve a problem that a terminal cannot continue to access a public network DN when failing to access a campus DN.

According to a first aspect, this application provides an access control method, including: A session management function network element SMF receives a session establishment request sent by a terminal. The SMF determines, based on the request, to send an authentication request to a campus server. The SMF receives an authentication failure response message sent by the campus server. When the SMF determines to accept the session establishment request, the SMF sends a policy association establishment request to a policy control function network element PCF, and receives a policy association establishment response sent by the PCF. The SMF enforces a policy rule for a session of the terminal according to a policy rule that is not of a campus in the policy association establishment response. The SMF sends a session establishment response message to the terminal.

In a possible implementation, before the SMF receives the authentication failure response message sent by an authentication server, the method further includes: The SMF obtains subscription information of the terminal device from a unified data management network element UDM, where the subscription information includes error handling indication information indicating that the session establishment request of the terminal is still accepted when authentication on the terminal fails. That the SMF determines to accept the session establishment request includes: The SMF determines, based on the error handling indication information, to accept the session establishment request.

In a possible implementation, that the SMF determines to accept the session establishment request includes: The SMF determines, based on local preconfiguration information, to accept the session establishment request.

In a possible implementation, the policy association establishment request includes indication information indicating that the terminal fails to access a campus data network DN, to enable a policy association response sent by the PCF not to include a policy information rule of the campus DN.

In a possible implementation, a policy association establishment response includes a policy information rule of the campus DN; and the method further includes: The SMF does not enforce the policy rule of the campus DN. The SMF sends indication information indicating that the enforcement of the policy rule of the campus DN fails to the PCF.

In a possible implementation, that the SMF determines, based on the request, to send an authentication request to a campus server includes: The SMF determines, based on location information of the terminal, the subscription information of the terminal, or the local configuration information of the SMF, to send the authentication request to the campus server.

According to a second aspect, this application provides an access control method, including: A policy control function network element PCF receives indication information indicating that authentication for a terminal to access a campus data network DN fails. The PCF sends a policy association message to an SMF based on the indication information, where the policy association message includes a policy rule that is not of a campus DN and does not include a policy rule of the campus DN.

In a possible implementation, that a PCF receives indication information indicating that authentication for a terminal to access a campus DN fails includes: The PCF receives a policy association establishment request sent by the session management function network element SMF, where the policy association establishment request includes the indication information indicating that the authentication for the terminal to access the campus DN fails, and the policy association message is a response message to the policy association establishment request.

In a possible implementation, that a PCF receives indication information indicating that authentication for a terminal to access a campus DN fails includes: The PCF receives a policy authorization request message sent by a campus server, where the policy authorization request message includes the indication information indicating that the authentication for the terminal to access the campus DN fails, and the policy association message is a policy association update message sent by the PCF to the SMF, to indicate that an updated policy rule of a session of the terminal includes the policy rule of a public network DN but does not include the policy rule of the campus DN.

According to a third aspect, this application provides an access control method, including: A campus server receives an authentication request sent by a session management function network element SMF, where the authentication request includes an identifier of a terminal that requests to access a campus data network DN. The campus server determines to reject accessing the campus DN by the terminal. The campus server sends an authentication response to the SMF, where the authentication response indicates that authentication succeeds but accessing the campus DN by the terminal is rejected.

In a possible implementation, the authentication response includes authorization profile index information, to enable the SMF to send the authorization profile index information to a policy control function network element PCF, where the authorization profile index information indicates that accessing the campus DN by the terminal is rejected.

According to a fourth aspect, an embodiment of this application provides a communication apparatus. The apparatus includes modules/units for performing the method according to any one of the first aspect to the third aspect and the possible implementations. The modules/units may be implemented by hardware, or may be implemented by hardware executing corresponding software.

According to a fifth aspect, an embodiment of this application provides a communication apparatus, including: a processor, and a memory and a communication interface that are separately coupled to the processor, where the communication interface is configured to communicate with another device; and the processor is configured to run instructions or a program in the memory, and perform, through the communication interface, the access control method according to any one of the first aspect to the third aspect and the possible implementations.

According to a sixth aspect, an embodiment of this application provides a computer-readable storage medium. The computer-readable storage medium stores computer-readable instructions. When the computer-readable instructions are run on a computer, the method according to any one of the first aspect to the third aspect and the possible implementations is performed.

According to a seventh aspect, an embodiment of this application provides a computer program product including instructions. When the computer program product runs on a computer, the method according to any one of the first aspect to the third aspect and the possible implementations is performed.

DESCRIPTION OF EMBODIMENTS

Figure 1:
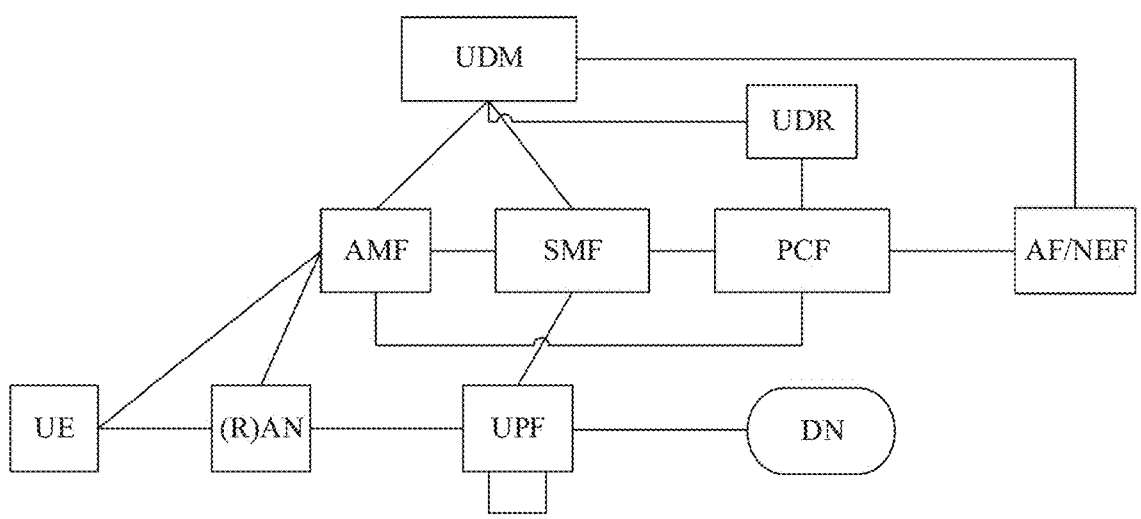
FIG. 1 is a diagram of a network architecture to which an embodiment of this application is applicable.

An access control method provided in embodiments of this application may be applied to a wireless communication system, for example, a 5G communication system or a future communication system. FIG. 1 is an example of a diagram of a wireless communication system architecture to which an embodiment of this application is applicable. The system architecture may include the following units or devices.

A terminal device may also be referred to as a terminal, a user equipment (UE), a mobile station, a mobile terminal, or the like. The terminal device may be widely used in various scenarios such as device-to-device (D2D), vehicle-to-everything (V2X) communication, machine type communication (MTC), the internet of things (IoT), virtual reality, augmented reality, industrial control, autonomous driving, telemedicine, a smart grid, smart furniture, smart office, a smart wearable, smart transportation, and a smart city. The terminal device may be a mobile phone, a tablet computer, a computer with a wireless transceiver function, a wearable device, a vehicle, an uncrewed aerial vehicle, a helicopter, an airplane, a ship, a robot, a robot arm, a smart home device, or the like. A specific technology and a specific device form that are used by the terminal device are not limited in embodiments of this application.

A RAN is configured to implement a radio-related function. The radio access network may also be referred to as an access network device or a base station, and is configured to enable the terminal device to access a wireless network. The radio access network may be a base station (base station), an evolved NodeB (eNodeB) in an LTE system or an LTE-advanced system (LTE-A), a next generation NodeB (gNB) in a 5G communication system, or a transmission reception point (TRP), a baseband unit (BBU), a Wi-Fi access point (AP), a base station in a future mobile communication system, an access node in a Wi-Fi system, or the like. The radio access network may alternatively be a module or a unit that completes some functions of the base station, for example, may be a central unit (CU) or a distributed unit (DU). A specific technology and a specific device form that are used by the radio access network are not limited in embodiments of this application. For example, in a network structure, a radio access network may be a CU node, a DU node, or a radio access network including a CU node and a DU node. Specifically, the CU node is configured to support protocols such as radio resource control (RRC), a packet data convergence protocol (PDCP), and a service data adaptation protocol (SDAP). The DU node is configured to support a radio link control (RLC) layer protocol, a media access control (MAC) layer protocol, and a physical layer protocol.

The core network may include one or more of the following network elements: an access and mobility management function (AMF) network element, a session management function (SMF) network element, a user plane function (UPF) network element, an application function (AF) network element, a policy control function (PCF) network element, and a unified data management (UDM) network element. It should be noted that a 5G network includes but is not limited to the foregoing one or more network elements.

The AMF is mainly used for attachment and mobility management of a terminal in a mobile network. In addition, the AMF is responsible for transferring a user policy between the UE and the PCF.

The SMF is mainly used for session management in the mobile network, for example, session establishment, modification, and release; enforcement of a control policy delivered by the PCF; selection of a UPF that provides a packet forwarding function; internet protocol (IP) address allocation to the terminal; and the like.

The UPF is mainly responsible for processing a user packet, for example, forwarding, charging, or lawful interception. The user plane network element may also be referred to as a PDU session anchor (PSA).

The AF is mainly used for transferring a requirement of an application side on a network side, for example, a QoS requirement, a charging policy requirement, a routing policy requirement, or a user status event subscription requirement. The AF may be a third-party function entity or an application service deployed by an operator, for example, an IMS voice call service. When interacting with a core network, an application function entity of a third-party application may further perform authorization processing via a NEF. For example, the AF sends a request message to the NEF, and the NEF determines whether the AF is allowed to send the request message. If verification succeeds, the NEF forwards the request message to a corresponding PCF or UDM.

The PCF is mainly responsible for policy control functions such as charging on a session and a service flow level, QoS bandwidth guarantee, mobility management, and UE policy decision making. PCFs connected to the AMF and the SMF are respectively corresponding to an AM PCF (PCF for Access and Mobility Control) and an SM PCF (PCF for Session Management). In an actual deployment scenario, the AM PCF and the SM PCF may be a same PCF entity, or may be different PCF entities.

The UDM is mainly responsible for functions such as managing subscription data and user access authorization.

The UDR is a unified data warehouse. The UDR is responsible for functions of storage and retrieval of subscription data, policy data, application data, and another type of data.

A DN provides a data transmission service for the terminal, and may be a public data network (PDN) like the internet, or may be a local access data network (LADN) like a campus DN.

The foregoing "network element" may also be referred to as an "entity" or an "apparatus". This is not limited in this application. In actual deployment, the network elements may be co-located. When two network elements are co-located, interaction between the two network elements provided in embodiments of this application becomes an internal operation of a co-located network element or may be omitted.

It should be understood that FIG. 1 uses a 5G communication system as an example to provide an example of the network architecture to which this embodiment of this application is applicable. An actually used network architecture may include more or fewer network elements than those shown in FIG. 1. Alternatively, this embodiment of this application may be applied to a future communication system.

A PDU session is a session service that implements PDU connectivity between the UE and the DN, and is identified by a PDU session ID. When the terminal device requests to establish the PDU session, an operator may configure a secondary authentication indication at a granularity of a DNN/S-NSSAI, to trigger the SMF to initiate an authentication procedure to a data network authentication, authorization, and accounting server (DN-AAA) in a PDU session establishment procedure, to verify whether the UE is allowed to access the DNN/S-NSSAI.

Figure 2:
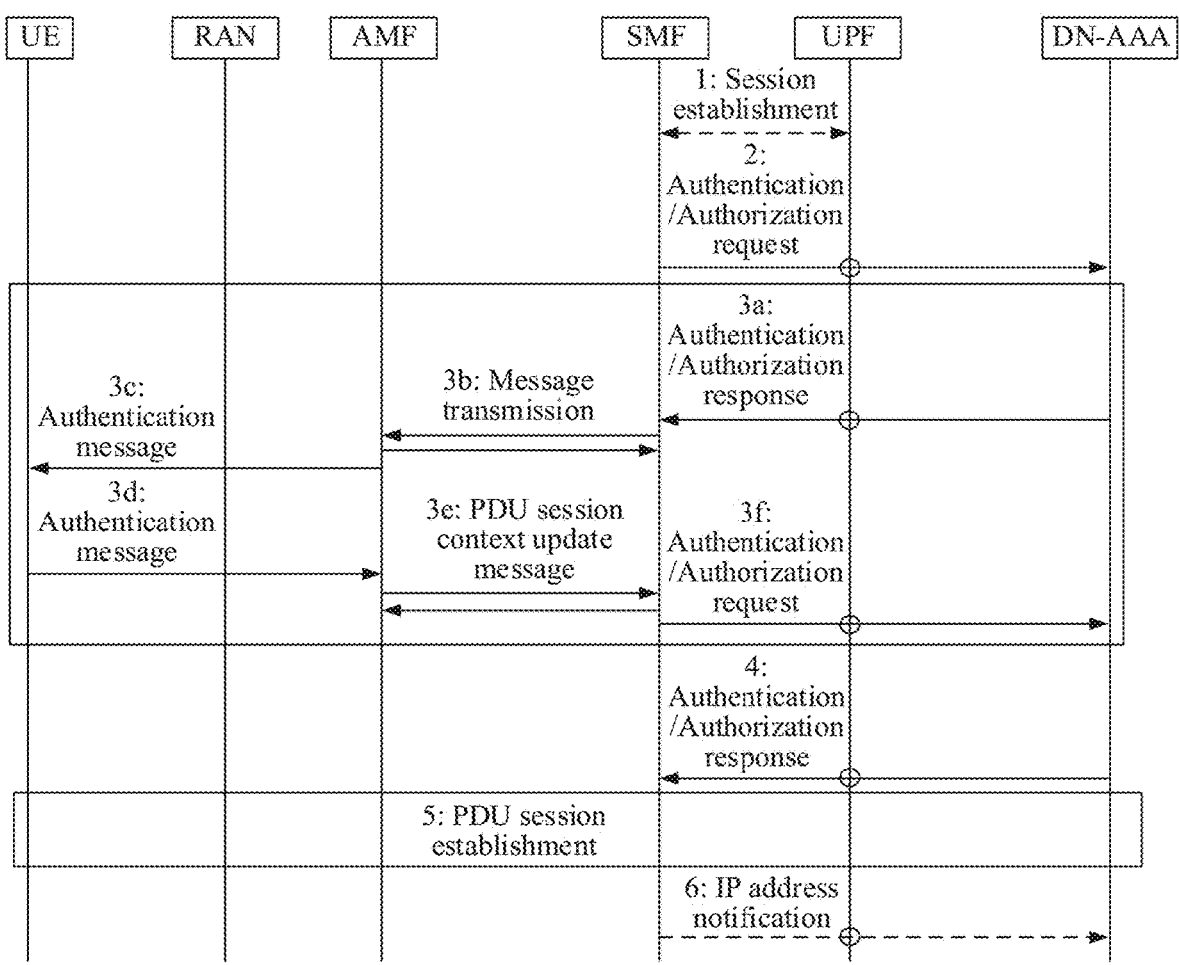
FIG. 2 is a schematic flowchart of secondary authentication according to an embodiment of this application.

Specifically, a secondary authentication process may be shown in FIG. 2, and includes the following procedure.

1: After the SMF receives a PDU session establishment request sent by the UE, a session establishment procedure is performed between the SMF and the UPF.

2: The SMF determines, based on local configuration information or subscription indication information sent by the UDM, to trigger secondary authentication, and sends, via the UPF, an authentication/authorization request to the DN-AAA.

In the secondary authentication process, the DN needs to exchange an extensible authentication protocol (EAP) message with the UE via the UPF or the SMF, to obtain information needed for the secondary authentication. Specifically, the following may be included.

3a: The DN-AAA sends an authentication/authorization response to the SMF via the UPF.

3b: The SMF performs message transmission with the AMF, to indicate the AMF to indicate the UE to upload the information needed for the secondary authentication.

3c: The AMF sends an authentication message to the UE over the RAN.

3d: The UE returns an authentication message to the AMF over the RAN, where the authentication message includes the information needed for the secondary authentication.

3e: The AMF sends a PDU session context update (PDUsession_updateSMcontext) message to the SMF.

3f: The SMF sends an authentication/authorization request to the DN-AAA via the UPF.

4: The DN-AAA returns an authentication/authorization response to the SMF via the UPF, where the authentication/authorization response includes indication information indicating that the authentication succeeds or the authentication fails.

5: If the authentication succeeds, the SMF continues to perform the PDU session establishment procedure.

6: Optionally, the SMF sends an IP address notification to the DN-AAA via the UPF.

If the authentication/authorization response returned by the DN-AAA indicates that the authentication fails, the SMF sends a PDU session establishment failure message to the UE.

Figure 3:
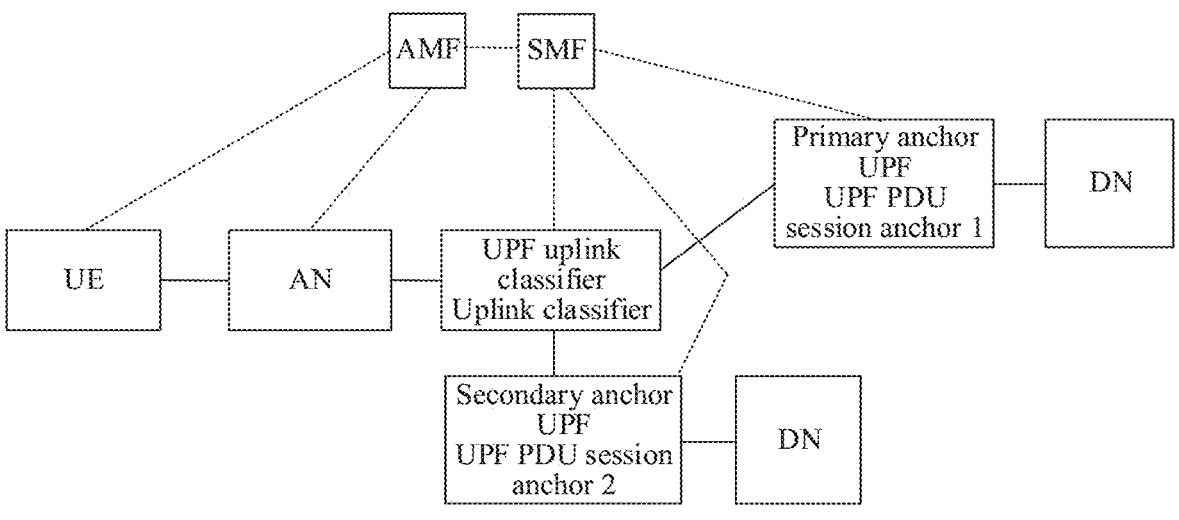
FIG. 3 is a diagram of a traffic steering architecture of a UPF UL CL according to an embodiment of this application.

To reduce a service access delay, an operator may deploy the UPF near an application access point, so that a user can access an application service nearby. As shown in FIG. 3, a UPF uplink classifier (UL CL) distinguishes a local service (for example, a service used inside a campus or an edge service deployed by a service provider) from a normal service, sends the local service to a central DN via a primary anchor UPF (UPF PDU session anchors 1) and sends the normal service to the campus DN via a secondary anchor UPF (UPF PDU session anchors 2). A UL CL-based traffic steering mode greatly improves convenience for a user of a network. In the foregoing traffic steering process, the UE has no awareness, and the SMF determines, based on a location of the UE, a type of a currently initiated service, campus service matching information, and the like, whether to allow the UE to access the campus DN.

A secondary authentication procedure may need to be performed to enable the terminal to access the campus DN. However, a current secondary authentication procedure for a terminal is allowed to be performed only once. As a result, when accessing the campus DN by the terminal is rejected, the terminal cannot continue to initiate a public network service. For example, for a campus network registered terminal, an operator may allow, via the UL CL UPF architecture, the terminal to access a public network service while accessing a campus network. After receiving a session establishment request of a terminal A, an SMF may determine, based on location information of the terminal A, subscription information of the terminal A, local configuration information, or the like, to initiate secondary authentication to an authentication server of the campus network. If the terminal A does not register with the campus network, or the authentication on the terminal A in the campus network fails due to another reason, accessing the campus network by the terminal A is rejected. However, because a secondary authentication procedure for a terminal is allowed to be performed only once, after a PDU session establishment request initiated by the terminal A is rejected, the terminal A cannot continue to initiate a public network service.

In view of this, an embodiment of this application provides an access control method, applied to a secondary authentication process, to resolve a problem that a terminal cannot continue to access a public network DN when failing to access a campus DN.

The method may be applied to the network architectures shown in FIG. 1 and FIG. 3. However, this embodiment of this application is not limited to be applicable only to a 5G communication system. This embodiment of this application may be further applied to a 4G communication system or a future communication system. The following uses a 5G communication system as an example for description.

Figure 4:
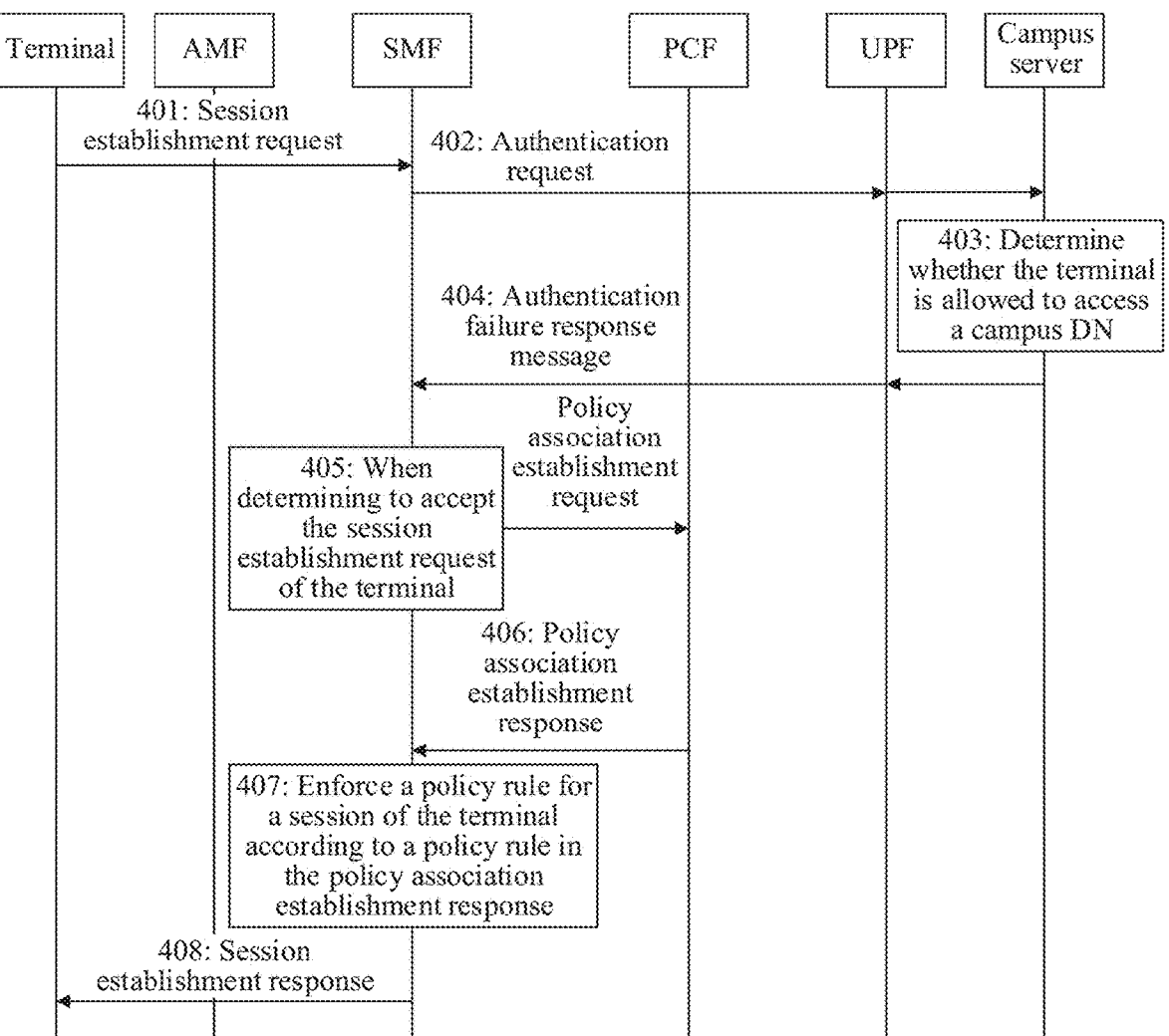
FIG. 4 is a schematic flowchart of an access control method according to an embodiment of this application.

FIG. 4 is a schematic flowchart of an access control method according to an embodiment of this application. As shown in the figure, the method may include the following steps.

Step 401: An SMF receives a session establishment request sent by a terminal.

Specifically, the terminal may send the session establishment request to an AMF, and the AMF selects the SMF, and then sends the session establishment request of the terminal to the SMF. The session establishment request sent by the terminal may be a PDU session establishment request, and is used to establish a PDU session. The PDU session that is requested to be established may include an IP-based PDU session (for example, an IPv4 PDU session or an IPv6 PDU session), or may be an Ethernet-type PDU session. In other words, a user address corresponds to a MAC address. This is not limited in the present invention.

The session establishment request sent by the terminal may include an identifier of a DNN or an S-NSSAI of a network that the terminal requests to access. In this case, the SMF may determine, based on the identifier of the DNN included in the session establishment request, a DN that the terminal requests to access. Alternatively, the session establishment request sent by the terminal may not include a DNN. In other words, the terminal does not need to determine a DN that the terminal requests to access, and the SMF determines the DN.

After receiving the session establishment request, the SMF may further request to obtain subscription data of the terminal from a UDM. Optionally, the subscription data may include indication information indicating that secondary authentication needs to be performed on the terminal, and the SMF determines to initiate the secondary authentication for the terminal. Alternatively, the SMF may determine, based on local configuration information, that secondary authentication needs to be initiated.

Step 402: The SMF determines, based on the session establishment request, to send an authentication request to a campus server.

The campus server is a server configured to perform authentication/authorization on an access request of a user, and may determine, based on a user identity and/or authentication information, whether to allow or reject the access request initiated by the user, in other words, return an authentication success/failure response to the SMF.

The campus server herein may be a campus DN-AAA. The campus server may be deployed in a campus, or may be deployed in a centralized manner with an operator network. This is not limited in the present invention.

Optionally, when the session establishment request received by the SMF includes the identifier of the DNN, the SMF may send the authentication request to a campus server corresponding to the identifier of the DNN, in other words, the DNN is a DNN corresponding to a campus service. When the session establishment request received by the SMF does not include the identifier of the DNN, the SMF may determine, based on location information of the terminal, subscription information of the terminal, or the local configuration information of the SMF, that the terminal requests to access a campus DN, and send an authentication request to a campus server corresponding to the campus DN; or the SMF may determine, based on service information of the session establishment request of the terminal, that the terminal requests to establish a session for a campus service, and the SMF may determine to send an authentication request to a campus server.

Alternatively, even if the session establishment request includes an identifier of a public network DN, the SMF may determine, based on location information of the terminal, subscription information of the terminal, the local configuration information of the SMF, or service information of the session request, to send an authentication request to a campus server.

Specifically, when the SMF sends the authentication request to the campus server, the authentication request may be forwarded via a UPF. To be specific, the SMF sends the authentication request to the UPF, and the UPF forwards the authentication request to the corresponding campus server.

Step 403: The campus server determines whether the terminal is allowed to access the campus DN.

Specifically, the campus server may obtain authentication information of the terminal to perform authentication on the terminal, and determine whether to allow the terminal to access the campus DN. For example, the campus server may exchange an EAP message with the terminal via the UPF, the SMF, and the AMF, as shown in step 3a to step 3f in FIG. 2, to obtain the information needed for performing authentication on the terminal.

If the campus server determines to allow the terminal to access the campus DN, the campus server sends an authentication success response message to the SMF. Optionally, the message may include a campus DN authorization profile index, used to index a policy rule configured on the SMF or a PCF, and may further include a campus DN authorization session aggregation maximum bit rate (DN authorized session AMBR) parameter and the like, so that the SMF establishes the session for the terminal according to an existing procedure, and the terminal can obtain a service of the campus service based on the established session.

When the campus server determines that the terminal is not allowed to access the campus DN, step 404 is performed.

Step 404: The campus server sends an authentication failure response message to the SMF.

The authentication failure response message sent by the campus server indicates that accessing the campus DN by the terminal is rejected. Optionally, the authentication failure response message may include information such as an authentication failure cause.

Step 405: When determining to accept the session establishment request of the terminal, the SMF sends a policy association establishment request to the PCF.

In a possible design, policy information of the terminal is locally configured on the SMF, to indicate that the session is still allowed to be established for the terminal even if the secondary authentication fails.

In another possible design, the SMF may obtain the subscription data of the terminal from the UDM after step 401. The obtained subscription data includes error handling indication information, and the error handling indication information indicates that the terminal is allowed to establish the session even if the secondary authentication on the terminal fails.

The SMF determines, based on the locally configured policy information or the obtained subscription data, to accept the session establishment request of the terminal, continues to perform a procedure of establishing the session for the terminal, and sends the policy association establishment request to the PCF. The request may include an ID of the session of the terminal, to request to obtain a policy rule of the session of the terminal.

Optionally, the policy association establishment request sent by the SMF to the PCF may include indication information indicating that accessing the campus DN by the terminal is rejected, so that the PCF does not send a policy rule of a campus.

Step 406: The PCF sends a policy association establishment response to the SMF.

The policy association establishment response sent by the PCF to the SMF includes the policy rule of the session determined by the PCF for the terminal, for example, a QoS control policy, a gating control policy, a flow forwarding policy, or a charging policy.

As described above, the policy association establishment request sent by the SMF may include the indication information indicating that accessing the campus DN by the terminal is rejected. In this case, the PCF does not send the policy rule of the campus DN to the SMF, and may send a policy rule of a public network.

Alternatively, if the policy association establishment request received by the PCF does not include the indication information indicating that accessing the campus DN by the terminal is rejected, the PCF may send both the policy rule of the campus DN and a policy rule of the public network DN to the SMF.

For example, the policy rule of the campus DN may include a data network access identifier (DNAI) corresponding to the campus service, routing information corresponding to the campus service, a policy and charging rule corresponding to the campus service, and the like.

Step 407: The SMF enforces the policy rule for the session of the terminal according to the policy rule in the policy association establishment response.

If the SMF sends, to the PCF in step 405, the indication information indicating that accessing the campus DN by the terminal is rejected, the policy association establishment response received by the SMF does not include the policy rule of the campus, and the SMF may directly enforce the policy rule for the session according to the policy rule carried in the policy association establishment response.

If the SMF does not send, to the PCF, the indication information indicating that accessing the campus DN by the terminal is rejected, the policy association establishment response received by the PCF may include the policy rule of the campus DN. In this case, the SMF needs to determine, in the received policy rules, which policy rule is the policy rule of the campus DN and which policy rule is the policy rule of the public network DN, enforce the policy rule of the public network DN, and reject enforcing the policy rule of the campus DN. Specifically, the SMF may determine, based on flow description information in a policy rule, whether the policy rule is the policy rule of the campus DN. For example, if an application identifier in the flow description information is a campus application, or IP 5-tuple information in the flow description information includes information such as a campus address segment, the SMF may determine that the policy rule is the policy rule of the campus DN. Optionally, the SMF may alternatively determine, based on DNAI access point information in a policy rule, that the rule is the policy rule of the campus. For example, if the policy rule includes a DNAI access point corresponding to the campus service, or includes a traffic steering destination address segment corresponding to the campus service, the SMF may determine that the policy rule is the policy rule of the campus.

Optionally, the SMF may further send, to the PCF, indication information indicating that enforcement of the policy of the campus DN fails, or the SMF may send a policy enforcement response message to the PCF, and use the message to carry a cause value of the enforcement failure, to indicate that the current terminal does not support access to the campus service.

Step 408: The SMF sends a session establishment response message to the terminal.

After enforcing the corresponding policy rule for the session of the terminal, the SMF may send a session establishment response to the terminal. Specifically, the SMF may send the session establishment response message to the terminal via the AMF.

In a possible implementation, the access control method in the foregoing embodiment of this application may also be applied to a process of modifying a secondary authentication result of the terminal.

For example, if the terminal is originally allowed to access the campus DN, a result of the secondary authentication process that is first performed by the terminal is that the authentication succeeds. However, if the campus server receives an information deletion indication for the terminal, the campus server may send information indicating that the authentication result becomes invalid to the SMF. The SMF may send a policy association update request to the PCF based on the information indicating that the authentication result becomes invalid, where the update request may include indication information indicating that accessing the campus DN by the terminal is rejected, to obtain an updated policy rule from the PCF, so that the terminal cannot continue to access the campus service; or the SMF may delete the policy rule of the campus DN from one or more enforced policy rules, so that continuing to access the campus service by the terminal is rejected.

For another example, if the terminal is originally not allowed to access the campus DN, a result of the secondary authentication process that is first performed by the terminal is that the authentication fails. After step 408, the campus server receives valid identity authentication information or updated authentication information for the terminal. The campus server may also actively send authentication success information to the SMF. The SMF may send a policy association update request to the PCF based on the authentication success information, to obtain the policy rule of the campus DN. Then, the SMF may enforce the policy rule of the campus DN for the session of the terminal.

In a conventional secondary authentication process, because secondary authentication for a terminal is performed only once, if accessing a campus DN by the terminal is rejected in the secondary authentication process, the terminal cannot continue to access a public network DN and initiate a public network service. However, in the foregoing method embodiment of this application, in a process of establishing the session for the terminal, although access by the terminal is rejected by the campus DN during the secondary authentication, the SMF still allows the terminal to continue to establish the session, and only rejects associating the terminal with the policy rule of the campus DN, but may still enforce the policy rule of the public network DN for the terminal. Therefore, accessing the campus DN by the terminal is rejected, and the terminal cannot initiate the campus service, but can still initiate a public network service, to resolve a valid requirement of the terminal to access a data network.

Figure 5:
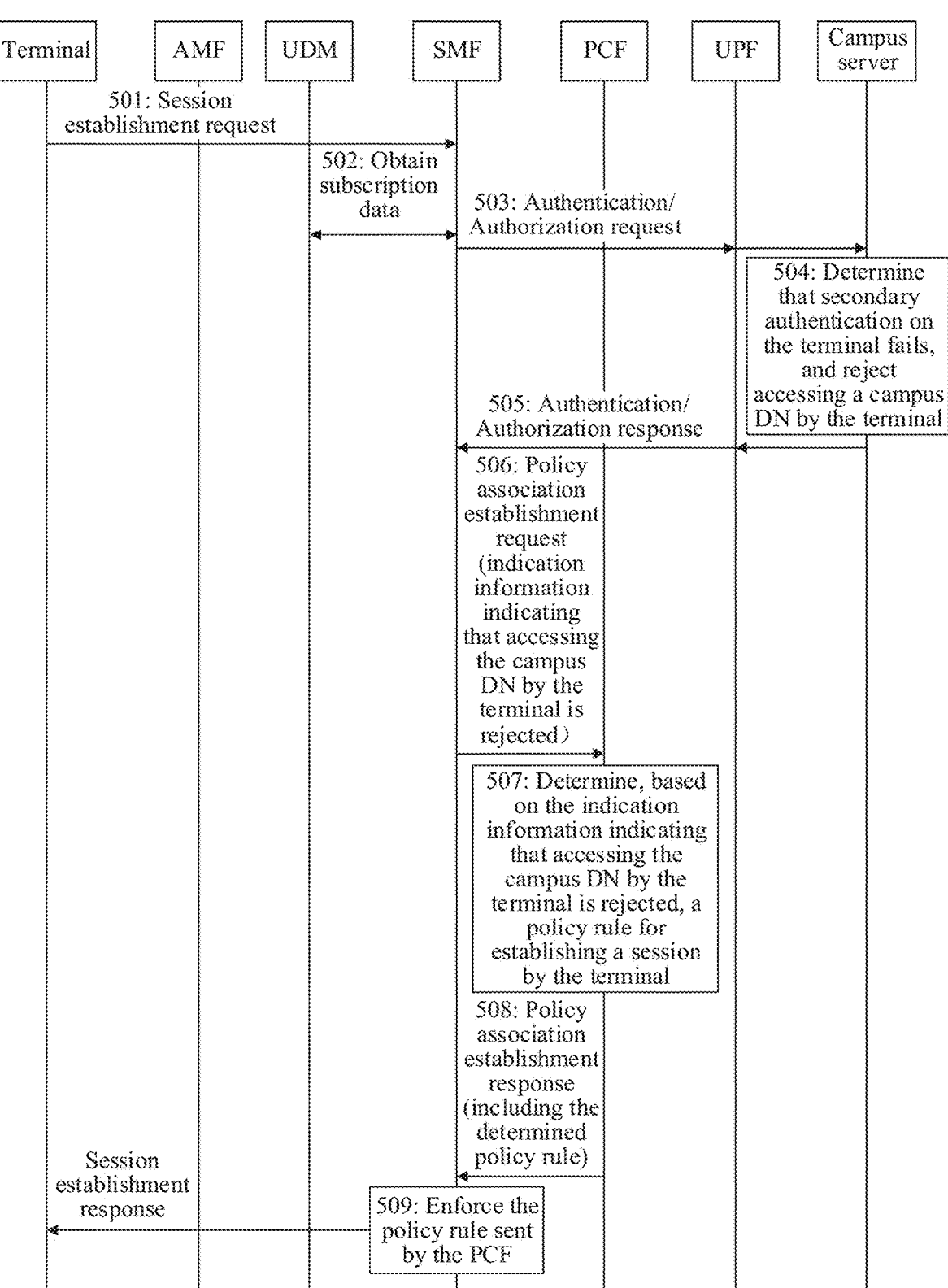
FIG. 5 is a schematic flowchart of an access control method according to an embodiment of this application.
Figure 6:
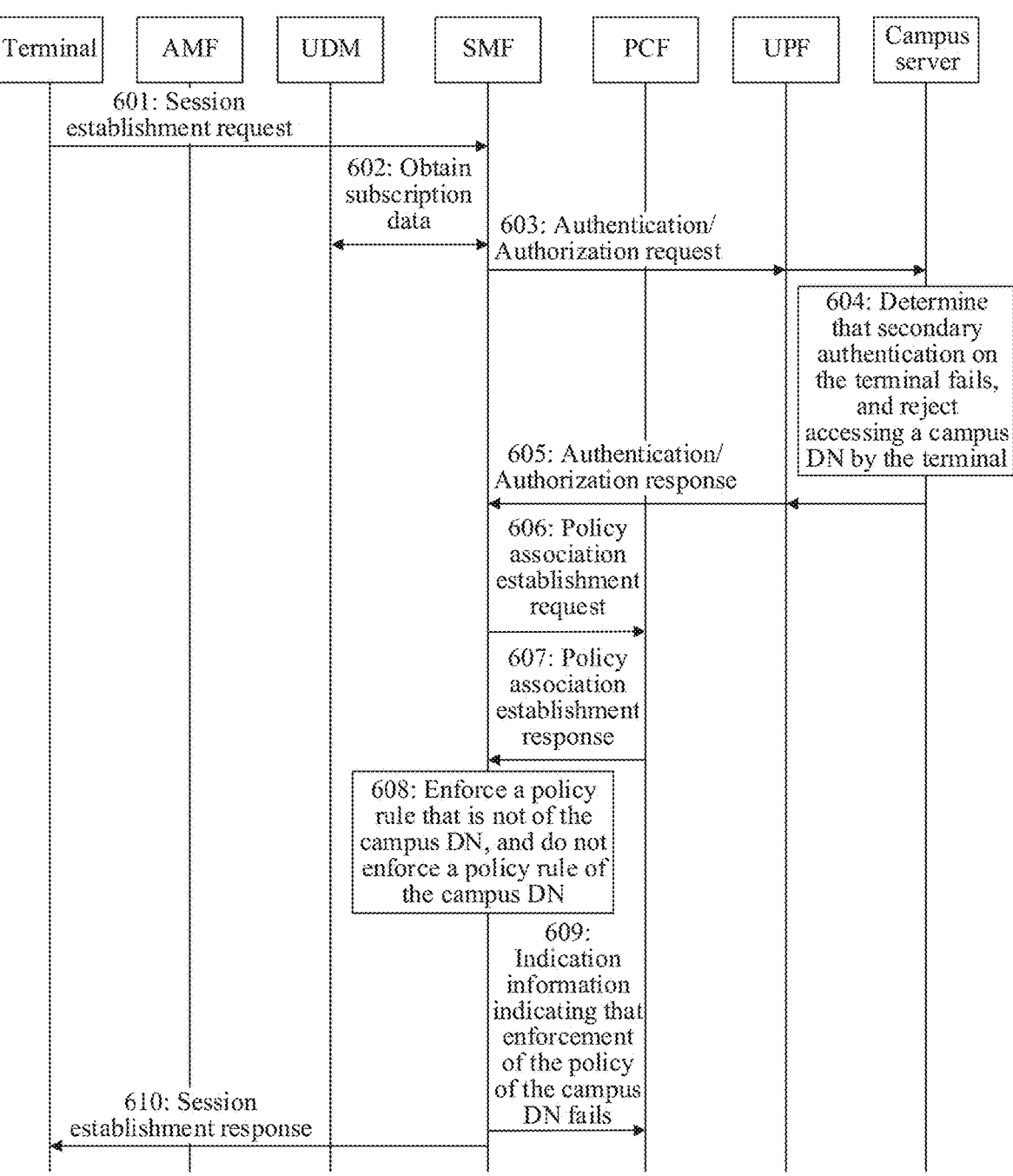
FIG. 6 is a schematic flowchart of an access control method according to an embodiment of this application.

To better understand the operation procedure in the foregoing embodiment of this application, the following provides examples with reference to FIG. 5 and FIG. 6.

Refer to the specific embodiment shown in FIG. 5. An access control method may include the following steps.

Step 501: A terminal sends a session establishment request to an SMF.

Specifically, the terminal may first send the session establishment request to an AMF, and then the AMF sends the session establishment request to the SMF.

Step 502: The SMF obtains subscription data of the terminal from a UDM.

The obtained subscription data includes indication information (secondary authentication indication) indicating that secondary authentication needs to be performed, and an error handling indication (error handling indication). The error handling indication indicates that the terminal is allowed to establish a session even if the secondary authentication on the terminal fails.

Optionally, the subscription data obtained by the SMF from the UDM may alternatively not include an error handling indication, and error handling indication information of the terminal may be locally configured in the SMF.

Step 503: The SMF sends an authentication/authorization request (authentication/authorization request) to a campus DN via a UPF. The authentication/authorization request is the authentication request in the foregoing embodiment.

Optionally, the campus DN performs secondary authentication on the terminal by exchanging an EAP message with the UE via the UPF and the SMF. For example, a secondary authentication process may be shown in step 3a to step 3f in FIG. 2.

Step 504: A campus server determines that the secondary authentication on the terminal fails, and rejects accessing the campus DN by the terminal.

Step 505: The campus server sends an authentication/authorization response to the SMF via the UPF. The authentication/authorization response indicates that the authentication fails, and accessing the campus DN by the terminal is rejected. The authentication/authorization response is the authentication failure response message in the foregoing embodiment.

Step 506: The SMF sends a policy association establishment request to the PCF, where the request includes indication information indicating that accessing the campus DN by the terminal is rejected.

Step 507: The PCF determines, based on the indication information indicating that accessing the campus DN by the terminal is rejected, a policy rule for establishing the session by the terminal.

Step 508: The PCF sends a policy association establishment response to the SMF, where the response includes the policy rule determined by the PCF in step 507.

Step 509: The SMF enforces the policy rule sent by the PCF, and sends a session establishment response to the terminal.

FIG. 6 also provides an example of an access control method. As shown in FIG. 6, the method may include the following steps.

Step 601 to step 605 are similar to step 501 to step 505, and are not repeated herein.

Step 606: The SMF sends a policy association establishment request to the PCF.

A difference from step 506 in the foregoing embodiment lies in that, in step 506, the indication information indicating that accessing the campus DN by the terminal is rejected needs to be carried, but in step 606, the indication information indicating that accessing the campus DN by the terminal is rejected may not be carried.

Step 607: The PCF sends a policy association establishment response to the SMF.

Because the PCF does not obtain the indication information indicating that accessing the campus DN by the terminal is rejected, the policy association establishment response sent by the PCF includes a policy rule of the campus DN.

Step 608: The SMF enforces a policy rule that is not of the campus DN, and does not enforce the policy rule of the campus DN.

Step 609: The SMF sends, to the PCF, indication information indicating that the enforcement of the policy of the campus DN fails.

Step 610: The SMF sends a session establishment response message to the terminal.

An embodiment of this application further provides an access control method, and the method can also resolve a problem that a terminal cannot continue to access a public network DN when failing to access a campus DN. A difference between the method and the foregoing embodiment lies in that, when accessing the campus DN by the terminal is rejected, in the foregoing embodiment, the SMF determines, based on the obtained subscription information or the local configuration information, whether to continue to establish the session for the terminal, while in the method embodiment, a DN may determine whether to continue to establish a session for the terminal.

Figure 7:
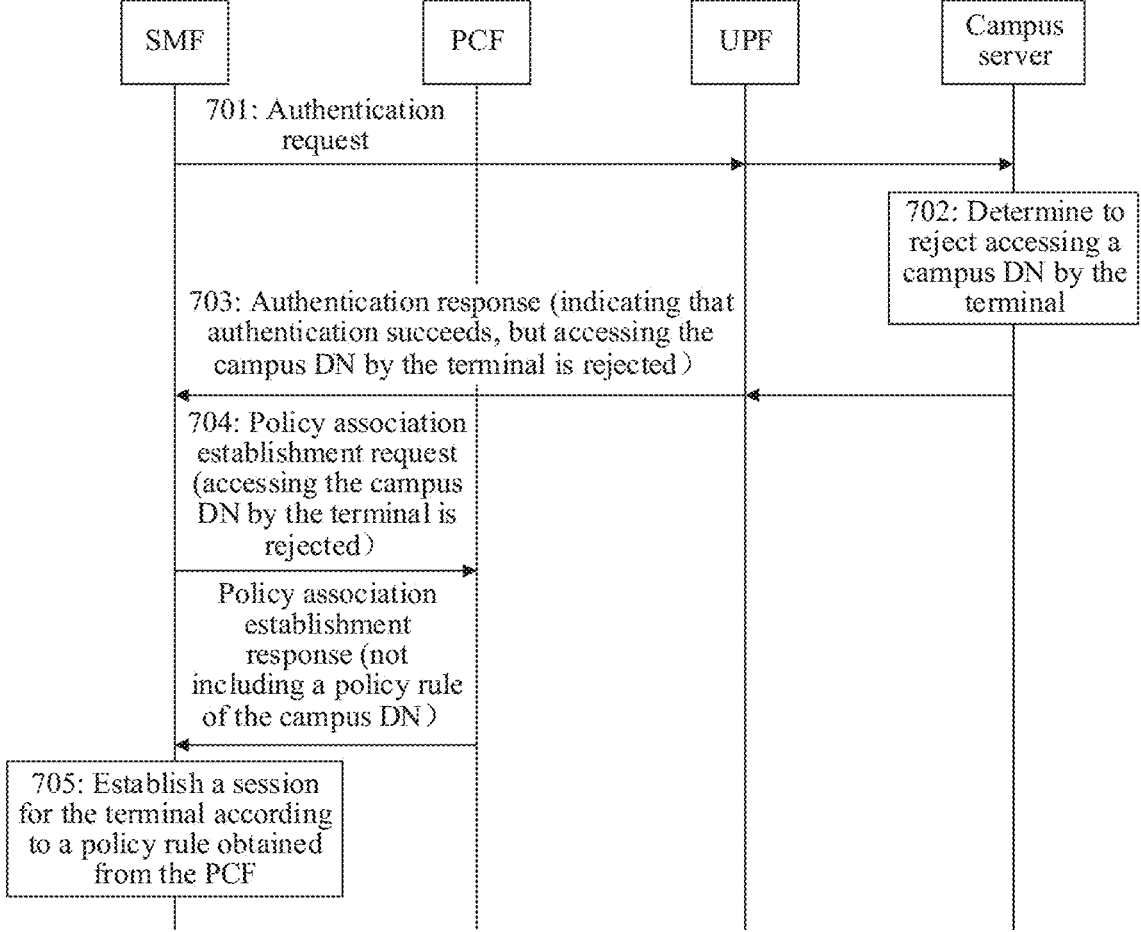
FIG. 7 is a schematic flowchart of an access control method according to an embodiment of this application.

FIG. 7 is a schematic flowchart of an access control method according to an embodiment of this application. As shown in the figure, the method may include the following procedure.

Step 701: An SMF sends an authentication request to a campus server.

The authentication request includes an identifier of a terminal that requests to access a campus DN, so that the campus server performs authentication on the terminal.

Step 702: The campus server determines to reject accessing the campus DN by the terminal.

Specifically, the campus server may obtain authentication information of the terminal to perform authentication on the terminal, and determine whether to allow the terminal to access the campus DN. For example, the campus server may exchange an EAP message with the terminal via a UPF, the SMF, and an AMF, as shown in step 3a to step 3f in FIG. 2, to obtain the information needed for performing authentication on the terminal.

The campus server determines, based on the obtained authentication information, that the terminal is not a valid registered terminal of the campus DN, or that the authentication fails due to another reason, and as a result, rejects accessing the campus DN by the terminal.

Step 703: The campus server sends an authentication response to the SMF, where the authentication response indicates that the authentication succeeds but accessing the campus DN by the terminal is rejected.

The campus server may determine, based on the obtained authentication information of the terminal, that the terminal is still allowed to establish a session even if accessing the campus DN by the terminal is rejected; or the campus server may determine, based on locally configured information, that the terminal is still allowed to establish a session even if accessing the campus DN by the terminal is rejected.

Optionally, the authentication success response sent by the campus server may carry an authorization profile index (DN authorization profile index), used to index policy information configured on the SMF or a PCF. When the campus server rejects accessing the campus DN by the terminal, the authorization profile index cannot be used to index a policy rule of the campus DN, but should be used to index a policy rule that is not of the campus DN. Therefore, the authorization profile index may be used as indication information indicating that accessing the campus DN by the terminal is rejected. Alternatively, the authorization profile index may directly indicate that accessing the campus DN by the terminal is rejected.

Alternatively, the campus server may set a new field in the authentication response, to indicate that although the authentication succeeds, accessing the campus DN by the terminal is rejected.

Step 704: The SMF sends a policy association establishment request to the PCF based on the received authentication response.

After the SMF receives the authentication response, because the authentication response indicates that the authentication succeeds, the SMF sends the policy association establishment request to the PCF, to obtain a policy rule of the session of terminal.

Optionally, the SMF may use the policy association establishment request sent to the PCF to carry the authorization profile index that is in the received authentication response. The PCF may determine, based on the authorization profile index, the policy rule that needs to be sent. Further, the PCF can indicate, based on the authorization profile index, that the policy rule of the campus DN is not indexed, so that the PCF is indicated that accessing the campus DN by the terminal is rejected. Alternatively, the authorization profile index may explicitly indicate that the terminal is not allowed to access the campus DN, and then the PCF selects a policy rule that is not of the campus DN based on the authorization profile index. In this process, the SMF may be unaware of an event that accessing the campus DN by the terminal is rejected. Because the SMF receives an authentication success response message, the SMF sends the policy association establishment request to the PCF based on the authorization profile index. This is consistent with a normal procedure of establishing a session for the terminal. However, the policy rule sent by the PCF based on the authorization profile index does not include the policy rule of the campus DN. Therefore, even if the SMF does not know that accessing the campus DN by the terminal is rejected, the SMF does not enforce the policy rule of the campus DN for the session of the terminal.

Alternatively, if the DN indicates, by using other indication information, that accessing the campus DN by the terminal is rejected, the SMF may determine, based on the indication information, that accessing the campus DN by the terminal is rejected. In this case, the SMF may indicate, to the PCF with reference to the operations in the embodiment shown in FIG. 4, that accessing the campus DN by the terminal is rejected. Alternatively, the SMF may not indicate to the PCF that accessing the campus DN by the terminal is rejected. After receiving the policy rule, the SMF enforces the policy rule that is not of the campus DN, and does not enforce the policy rule of the campus DN.

Step 705: The SMF establishes the session for the terminal according to the policy rule obtained from the PCF.

In a conventional secondary authentication process, because secondary authentication for a terminal is performed only once, if accessing the campus DN by the terminal is rejected in the secondary authentication process, the terminal cannot continue to access a public network DN and initiate a public network service. In the foregoing method embodiment of this application, when performing secondary authentication on the terminal, the campus server may determine, based on the locally configured information or the obtained authentication information of the terminal, that the terminal is still allowed to establish the session even if accessing the campus DN by the terminal is rejected, and then send, to the SMF, the authentication response indicating that the authentication succeeds but accessing the campus DN by the terminal is rejected, so that the SMF and the PCF can configure the policy rule that is not of the campus DN for the terminal, and the terminal can still initiate a public network service to access a public network DN, to resolve a valid requirement of a terminal to access a data network.

Figure 8:
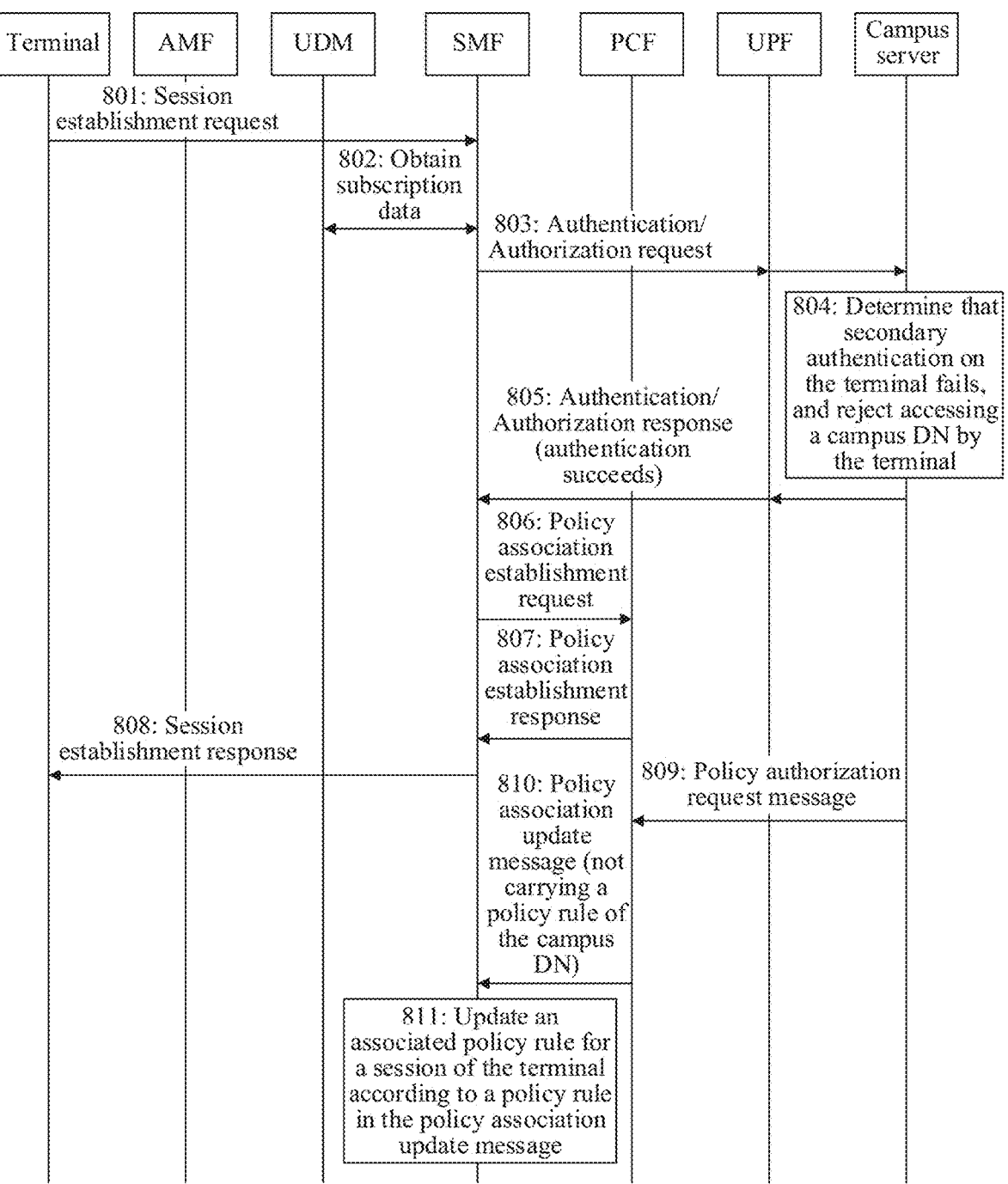
FIG. 8 is a schematic flowchart of an access control method according to an embodiment of this application.

In another possible implementation, the authentication response sent by the campus server to the SMF may indicate only that the authentication succeeds, and does not indicate accessing the campus DN by the terminal is rejected. Then, the campus server may send indication information to the PCF, to indicate the PCF not to provide the policy rule of the campus DN for the terminal. FIG. 8 is an example of a schematic flowchart in this implementation. As shown in the figure, the following steps are included.

Step 801 to step 804 are similar to step 501 to step 504, and details are not described herein again.

Step 805: The campus server sends an authentication/authorization response to the SMF via the UPF, where the response indicates that the authentication succeeds.

Step 806: The SMF sends a policy association establishment request to a PCF.

Step 807: The PCF sends a policy association establishment response to the SMF.

Step 808: The SMF sends a session establishment response to the terminal.

Step 809: The campus server sends a policy authorization request message (policy authorization create request) to the PCF, where the policy authorization request message is used to request the PCF to stop providing a policy rule of the campus DN for the terminal.

Step 810: The PCF sends a policy association update message to the SMF, where the message does not carry the policy rule of the campus DN.

Step 811: The SMF updates an associated policy rule for the session of the terminal according to a policy rule in the policy association update message.

Figures 9, 10:
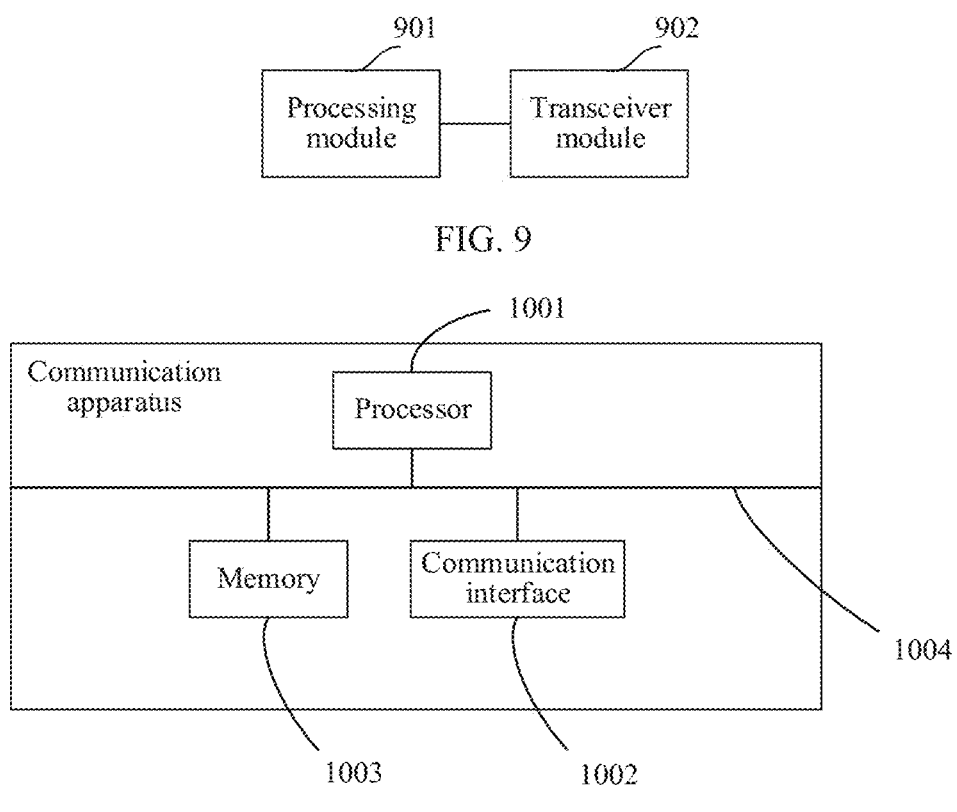
FIG. 9 is a diagram of a structure of a communication apparatus according to an embodiment of this application.
FIG. 10 is a diagram of a structure of another communication apparatus according to an embodiment of this application.

FIG. 9 is a diagram of a communication apparatus according to an embodiment of this application. The communication apparatus includes a processing module 901 and a transceiver module 902. The processing module 901 is configured to implement data processing by the communication apparatus. The transceiver module 902 is configured to perform information receiving and sending processing in the foregoing method embodiments. It should be understood that, in this embodiment of this application, the processing module 901 may be implemented by a processor or a processor-related circuit component (or referred to as a processing circuit). The transceiver module 902 may be implemented by a receiver or a receiver-related circuit, and a transmitter or a transmitter-related circuit component.

For example, the communication apparatus may be a communication apparatus device, or may be a chip used in the communication apparatus device, or another combined device or component that has a function of the communication apparatus device.

When the communication apparatus is a session management function network element SMF, the transceiver module 902 is configured to receive a session establishment request sent by a terminal, and the processing module 901 is configured to determine, based on the request, to send an authentication request to a campus server via the transceiver module 902. The transceiver module 902 is further configured to receive an authentication failure response message sent by the campus server. The processing module 901 is further configured to: when determining to accept the session establishment request, send a policy association establishment request to a policy control function network element PCF via the transceiver module 902, and receive a policy association establishment response sent by the PCF. The processing module 901 is further configured to enforce a policy rule for a session of the terminal according to a policy rule in the policy association establishment response. The transceiver module 902 is further configured to send a session establishment response message to the terminal.

In addition, the foregoing modules may be further configured to support another process performed by the SMF in any one of the embodiments and the implementations of the embodiments shown in FIG. 4 to FIG. 8. For beneficial effects, refer to the foregoing descriptions. Details are not described herein again.

When the communication apparatus is a policy control function network element PCF, the transceiver module 902 is configured to receive indication information indicating that authentication for a terminal to access a campus data network DN fails. The processing module 901 is configured to send a policy association message to an SMF based on the indication information via the transceiver module 902, where the policy association message includes a policy rule that is not of the campus DN and does not include a policy rule of the campus DN.

Optionally, when receiving the indication information indicating that the authentication for the terminal to access the campus DN fails, the transceiver module 902 is specifically configured to receive a policy association establishment request sent by the session management function network element SMF, where the policy association establishment request includes the indication information indicating that the authentication for the terminal to access the campus DN fails, and the policy association message is a response message to the policy association establishment request.

Optionally, when receiving the indication information indicating that the authentication for the terminal to access the campus DN fails, the transceiver module 902 is specifically configured to receive a policy authorization request message sent by a campus server, where the policy authorization request message includes the indication information indicating that the authentication for the terminal to access the campus DN fails, and the policy association message is a policy association update message sent to the SMF, to indicate that an updated policy rule of a session of the terminal includes the policy rule of a public network DN but does not include the policy rule of the campus DN.

In addition, the foregoing modules may be further configured to support another process performed by the PCF in any one of the embodiments and the implementations of the embodiments shown in FIG. 4 to FIG. 8. For beneficial effects, refer to the foregoing descriptions. Details are not described herein again.

When the communication apparatus is a campus server, the transceiver module 902 is configured to receive an authentication request sent by a session management function network element SMF, where the authentication request includes an identifier of a terminal that requests to access a campus data network DN. The processing module 901 is configured to determine to reject accessing the campus DN by the terminal. The transceiver module 902 is further configured to send an authentication response to the SMF, where the authentication response indicates that authentication succeeds but accessing the campus DN by the terminal is rejected.

In addition, the foregoing modules may be further configured to support another process performed by the campus server in any one of the embodiments and the implementations of the embodiments shown in FIG. 4 to FIG. 8. For beneficial effects, refer to the foregoing descriptions. Details are not described herein again.

FIG. 10 is a diagram of another communication apparatus according to an embodiment of this application. The communication apparatus includes a processor 1001 shown in FIG. 10 and a communication interface 1002 connected to the processor 1001.

The processor 1001 may be a general-purpose processor, a microprocessor, an application-specific integrated circuit (ASIC), a field programmable gate array (FPGA) or another programmable logic device, a discrete gate or a transistor logic device, or one or more integrated circuits configured to control program execution of the solutions in this application. The general-purpose processor may be a microprocessor, any conventional processor, or the like. The steps of the method disclosed with reference to embodiments of this application may be directly performed by a hardware processor, or may be performed by using a combination of hardware in the processor and a software module.

The communication interface 1002 uses any apparatus like a transceiver, and is configured to communicate with another device or a communication network, for example, a RAN.

In this embodiment of this application, the processor 1001 is configured to invoke the communication interface 1002 to perform a receiving and/or sending function, and perform the user plane function redundancy method according to any one of the foregoing possible implementations.

Further, the communication apparatus may further include a memory 1003 and a communication bus 1004.

The memory 1003 is configured to store program instructions and/or data, so that the processor 1001 invokes the instructions and/or the data stored in the memory 1003, to implement the foregoing functions of the processor 1001. The memory 1003 may be a read-only memory (read-only memory, ROM) or another type of static storage device capable of storing static information and instructions, a random access memory (RAM) or another type of dynamic storage device capable of storing information and instructions. It may alternatively be an electrically erasable programmable read-only memory (EEPROM) or any other medium for carrying or storing expected program code in a form of an instruction or a data structure and accessible by a computer, but is not limited thereto. The memory 1003 may exist independently, for example, an off-chip memory, and is connected to the processor 1001 through the communication bus 1004. The memory 1003 may alternatively be integrated with the processor 1001.

The communication bus 1004 may include a path for transferring information between the foregoing components.

When the communication apparatus is a session management function network element SMF, the processor 1001 performs, through the communication interface 1002, the following operations: receiving a session establishment request sent by a terminal, and determining, based on the request, to send an authentication request to a campus server; receiving an authentication failure response message sent by the campus server; when determining to accept the session establishment request, sending a policy association establishment request to a policy control function network element (PCF), and receiving a policy association establishment response sent by the PCF; enforcing a policy rule for a session of the terminal according to a policy rule in the policy association establishment response; and sending a session establishment response message to the terminal.

In addition, the foregoing modules may be further configured to support another process performed by the SMF in any one of the embodiments and the implementations of the embodiments shown in FIG. 4 to FIG. 8. For beneficial effects, refer to the foregoing descriptions. Details are not described herein again.

When the communication apparatus is a policy control function network element (PCF), the processor 1001 performs, through the communication interface 1002, the following operations: receiving indication information indicating that authentication for a terminal to access a campus data network (DN) fails; and sending a policy association message to an SMF based on the indication information, where the policy association message includes a policy rule that is not of the campus DN and does not include a policy rule of the campus DN.

Optionally, when receiving, through the communication interface 1002, the indication information indicating that the authentication for the terminal to access the campus DN fails, the processor 1001 is specifically configured to receive a policy association establishment request sent by the session management function network element SMF, where the policy association establishment request includes the indication information indicating that the authentication for the terminal to access the campus DN fails, and the policy association message is a response message to the policy association establishment request.

Optionally, when receiving, through the communication interface 1002, the indication information indicating that the authentication for the terminal to access the campus DN fails, the processor 1001 is specifically configured to receive a policy authorization request message sent by a campus server, where the policy authorization request message includes the indication information indicating that the authentication for the terminal to access the campus DN fails, and the policy association message is a policy association update message sent by the PCF to the SMF, to indicate that an updated policy rule of a session of the terminal includes the policy rule of a public network DN but does not include the policy rule of the campus DN.

In addition, the foregoing modules may be further configured to support another process performed by the PCF in any one of the embodiments and the implementations of the embodiments shown in FIG. 4 to FIG. 8. For beneficial effects, refer to the foregoing descriptions. Details are not described herein again.

When the communication apparatus is a campus server, the processor 1001 performs, through the communication interface 1002, the following operations: receiving an authentication request sent by a session management function network element (SMF), where the authentication request includes an identifier of a terminal that requests to access a campus data network (DN); determining to reject accessing the campus DN by the terminal; and sending an authentication response to the SMF, where the authentication response indicates that authentication succeeds but accessing the campus DN by the terminal is rejected.

In addition, the foregoing modules may be further configured to support another process performed by the campus server in any one of the embodiments and the implementations of the embodiments shown in FIG. 4 to FIG. 8. For beneficial effects, refer to the foregoing descriptions. Details are not described herein again.

Based on a same technical concept, an embodiment of this application further provides a computer-readable storage medium. The computer-readable storage medium stores computer-readable instructions. When the computer-readable instructions are run on a computer, the access control method according to any one of the foregoing possible implementations is performed.

An embodiment of this application provides a computer program product including instructions. When the computer program product runs on a computer, the method embodiments are performed.

In descriptions of embodiments of this application, the term "and/or" describes an association relationship between associated objects and indicates that three relationships may exist. For example, A and/or B may indicate the following three cases: Only A exists, both A and B exist, and only B exists. "A plurality of" in this application means two or more.

In addition, it should be understood that, in the descriptions of this application, the terms "first", "second", and "third" are merely intended for differentiation and description and shall not be understood as indication or implication of relative importance, or indication or implication of an order. Reference to "an embodiment", "some embodiments", or the like described in this specification indicates that one or more embodiments of this application include a specific feature, structure, or characteristic described with reference to embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

An embodiment of this application provides a computer-readable storage medium storing a computer program. The computer program includes instructions for performing the foregoing method embodiments.

An embodiment of this application provides a computer program product including instructions. When the computer program product runs on a computer, the computer performs the foregoing method embodiments.

Persons skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to embodiments of this application. It should be understood that computer program instructions may be used to implement each procedure and/or each block in the flowcharts and/or the block diagrams and a combination of procedures and/or blocks in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a specific function in one or more procedures in the flowcharts and/or one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or one or more blocks in the block diagrams.

These computer program instructions may alternatively be loaded onto the computer or the another programmable data processing device, so that a series of operation steps are performed on the computer or the another programmable device to generate computer-implemented processing, and instructions executed on the computer or the another programmable device provide steps for implementing a function specified in one or more procedures in the flowchart and/or one or more blocks in the block diagram.

Although embodiments of this application are described, persons skilled in the art can make changes and modifications to these embodiments after they learn of a basic inventive concept. Therefore, the following claims are intended to be construed as to cover the preferred embodiments and all changes and modifications falling within the scope of this application.

It is clearly that persons skilled in the art can make various modifications and variations to embodiments of this application without departing from the scope of embodiments of this application. In this case, this application is intended to cover these modifications and variations of embodiments of this application provided that they fall within the scope of the following claims and their equivalent technologies.

What is claimed is:

1. An access control method, wherein the method comprises:

receiving, by a session management function network element (SMF), a session establishment request from a terminal;

sending, by the SMF, an authentication request to a campus server based on the session establishment request;

receiving, by the SMF, an authentication failure response message from the campus server; and when the SMF determines to accept the session establishment request after receiving the authentication failure response message indicating that accessing a campus data network (DN) by the terminal is rejected, sending, by the SMF, a policy association establishment request to a policy control function network element (PCF), and receiving a policy rule from the PCF, wherein the policy rule is a policy rule that is not of a campus, and the policy rule is used to establish a session of the terminal.

2. The method according to claim 1, wherein before the SMF receives the authentication failure response message from an authentication server, the method further comprises:

obtaining, by the SMF, subscription information of the terminal from a unified data management network element (UDM), wherein the subscription information comprises error handling indication information indicating that the session establishment request of the terminal is still accepted when authentication on the terminal fails; and that the SMF determines to accept the session establishment request comprises:

determining, by the SMF based on the error handling indication information, to accept the session establishment request.

3. The method according to claim 1, wherein that the SMF determines to accept the session establishment request comprises:

determining, by the SMF based on local configuration information, to accept the session establishment request.

4. The method according to claim 1, wherein the policy association establishment request comprises indication information indicating that the terminal fails to access the campus DN, to enable a policy association response sent by the PCF not to comprise a policy rule of the campus DN.

5. The method according to claim 1, wherein a policy association establishment response comprises a policy rule of the campus DN; and the method further comprises:

skipping, by the SMF, enforcing the policy rule of the campus DN; and sending, by the SMF to the PCF, indication information indicating that the enforcement of the policy rule of the campus DN fails.

6. The method according to claim 5, wherein the policy rule of the campus DN comprises a data network access identifier (DNAI) corresponding to a campus service, routing information corresponding to the campus service, and a policy and charging rule corresponding to the campus service.

7. The method according to claim 5, wherein the method further comprises:

determining, by the SMF, that a policy rule is the policy rule of the campus DN based on DNAI access point information corresponding to a campus service.

8. The method according to claim 1, wherein the sending, by the SMF, an authentication request to a campus server based on the session establishment request comprises:

determining, by the SMF based on location information of the terminal, subscription information of the terminal, or local configuration information of the SMF, to send the authentication request to the campus server.

9. The method according to claim 1, wherein the authentication failure response message comprises an authentication failure cause.

10. The method according to claim 1, wherein the policy association establishment request comprises an identifier (ID) of a session of the terminal.

11. The method according to claim 1, wherein the sending, by the SMF, an authentication request to a campus server based on the session establishment request comprises:

determining, by the SMF based on service information of the session establishment request, that the terminal requests to establish a session for a campus service; and determining, by the SMF, to send the authentication request to the campus server.

12. An access control method, wherein the method comprises:

receiving, by a policy control function network element (PCF), indication information indicating that authentication for a terminal to access a campus data network (DN) fails; and sending, by the PCF, a policy association message to a session management function network element (SMF) based on the indication information, wherein the policy association message comprises a policy rule that is not of the campus DN and does not comprise a policy rule of the campus DN.

13. The method according to claim 12, wherein the receiving, by a PCF, indication information indicating that authentication for a terminal to access a campus DN fails comprises:

receiving, by the PCF, a policy association establishment request sent by the SMF, wherein the policy association establishment request comprises the indication information indicating that the authentication for the terminal to access the campus data network DN fails; and the policy association message is a response message to the policy association establishment request.

14. The method according to claim 13, wherein the policy association establishment request comprises an identifier (ID) of a session of the terminal.

15. The method according to claim 12, wherein the receiving, by a PCF, indication information indicating that authentication for a terminal to access a campus DN fails comprises:

receiving, by the PCF, a policy authorization request message sent by a campus server, wherein the policy authorization request message comprises the indication information indicating that the authentication for the terminal to access the campus data network DN fails; and the policy association message is a policy association update message sent by the PCF to the SMF, to indicate that an updated policy rule of a session of the terminal comprises the policy rule of a public network DN but does not comprise the policy rule of the campus DN.

16. An access control method, wherein the method comprises:

receiving, by a campus server, an authentication request from a session management function network element (SMF), wherein the authentication request comprises an identifier of a terminal that requests to access a campus data network (DN);

determining, by the campus server, to reject accessing the campus DN by the terminal; and sending, by the campus server, an authentication response to the SMF, wherein the authentication response indicates that authentication succeeds but accessing the campus DN by the terminal is rejected, wherein the authentication response comprises an authentication failure cause.

17. The method according to claim 16, wherein the authentication response comprises authorization profile index information, to enable the SMF to send the authorization profile index information to a policy control function network element (PCF), wherein the authorization profile index information indicates that accessing the campus DN by the terminal is rejected.

18. The method according to claim 17, wherein the authorization profile index information is used to index policy information configured on the SMF or the PCF.

19. The method according to claim 16, wherein the determining, by the campus server, to reject accessing the campus DN by the terminal comprises:

exchanging an extensible authentication protocol (EAP) message with the terminal to obtain authentication information.

20. The method according to claim 19, wherein the method further comprises:

determining, by the campus server based on the obtained authentication information or locally configured information, that the terminal is still allowed to establish a session even if accessing the campus DN by the terminal is rejected.

* * * * *